(12) United States Patent
Greenberg et al.

(10) Patent No.: US 12,153,139 B2
(45) Date of Patent: Nov. 26, 2024

(54) SIX DIMENSIONAL TRACKING OF SPARSE LADAR DATA

(71) Applicant: Raytheon Company, Tewksbury, MA (US)

(72) Inventors: Adam Hodge Greenberg, Los Angeles, CA (US); Eran Marcus, Culver City, CA (US)

(73) Assignee: Raytheon Company, Tewksbury, MA (US)

( * ) Notice: Subject to any disclaimer, the term of this patent is extended or adjusted under 35 U.S.C. 154(b) by 913 days.

(21) Appl. No.: 17/138,386

(22) Filed: Dec. 30, 2020

(65) Prior Publication Data

US 2022/0206152 A1 Jun. 30, 2022

(51) Int. Cl.
*G01S 17/89* (2020.01)
*G01S 7/481* (2006.01)
*G01S 7/4861* (2020.01)

(52) U.S. Cl.
CPC ............ *G01S 17/89* (2013.01); *G01S 7/4814* (2013.01); *G01S 7/4861* (2013.01)

(58) Field of Classification Search
None
See application file for complete search history.

(56) References Cited

U.S. PATENT DOCUMENTS

| | | | |
|---|---|---|---|
| 10,620,315 B2 | 4/2020 | Zellinger et al. | |
| 10,641,900 B2 | 5/2020 | Dussan et al. | |
| 10,670,718 B1* | 6/2020 | Dussan | G01S 7/4808 |
| 10,845,468 B2 | 11/2020 | Marron | |
| 2010/0208244 A1* | 8/2010 | Earhart | G01S 17/894 |
| | | | 356/139.01 |
| 2018/0299556 A1 | 10/2018 | Marcus et al. | |
| 2020/0371240 A1 | 11/2020 | Newman et al. | |
| 2021/0241026 A1* | 8/2021 | Deng | G01S 17/89 |

* cited by examiner

*Primary Examiner* — Eric L Bolda
(74) *Attorney, Agent, or Firm* — Schwegman Lundberg & Woessner, P.A.

(57) ABSTRACT

An apparatus, and method of operating the same processes of LADAR data including iterating back and forth between target detection in a 2-D array having range and range rate dimension, and a 4-D array having azimuth, azimuthal velocity, elevation, & elevation velocity dimensions. The apparatus includes a receiver and a processor arranged to generate photo events including target signal photo events and background photo events, transform the photo events into the 2-D target tracking array including range and range-rate parameters and tag photo events determined to be 2-D target signal photo events. The processor transforms tagged photo events into the 4-D target and tags photo events determined to be 4-D target signal photo events.

20 Claims, 8 Drawing Sheets

SIX DIMENSIONAL TRACKING OF SPARSE LADAR DATA

TECHNICAL FIELD

The subject disclosure relates to laser radar systems and, more particularly to processing sparse LADAR data.

BACKGROUND

Laser Detection and Ranging (LADAR), also referred to as LIDAR or LiDAR, is a laser-based radar technology used to capture high-resolution imaging information and to measure distances by illuminating a target object or terrain with laser light. LADAR has been used to create high resolution survey maps of geographic areas and detailed 3-D images of objects. More recently, LADAR has been implemented to support control and navigation of autonomous cars. LADAR uses ultraviolet, visible, or near infrared light to image objects or terrains. Using a narrow laser beam, a LADAR system can detect physical features of objects with extremely high resolutions.

A rigid target moving with a constant 3-D velocity has a fixed relationship with its component range, range rate, azimuth, azimuth rate, elevation, and elevation rate. In order to find where the rigid target is, a LADAR system must detect and determine a common value for each of the target's range, range rate, azimuth, azimuth rate, elevation, and elevation rate for all of the points comprising the target. Existing LADAR tracking target detection may ignore subsets of these dimensions, creating slower processing times, range ambiguity, inefficient background rejection, lack of motion compensation, and inability to simultaneously detect, track, and motion compensate multiple targets.

SUMMARY OF THE TECHNOLOGY

The application describes exemplary tracking and motion compensation systems and methods for iterating between target detection in two dimensions, including range and range rate dimensions, and four dimensions, including azimuth, azimuthal velocity, elevation, & elevation velocity dimensions. This detection technique may leverage the binary nature of Geiger-Mode Avalanche Photodiode data (GMAPD) to perform target acquisition using sparse operations, and resolving range ambiguities by utilizing information regarding the nature of a transmitted waveform. The subject detection technique may perform six dimensional state-space target segmentation, wherein the target data is motion compensated upon acquisition and if multiple targets are present in the data, the tracking and motion compensation systems and methods can simultaneously detect, track, and motion compensate each one.

An example laser and detection and ranging system includes a receiver arranged to receive scattered laser pulses. The laser and detection and ranging system includes a processor. The processor is arranged to generate photo events based on the received scattered laser pulses, as a first step. The photo events include target signal photo events and background photo events. The processor is arranged to transform the photo events into a two dimensional 2-D target tracking array including range and range-rate parameters, discard photo events determined to be background photo events, and tag photo events determined to be 2-D target signal photo events, as a second step. The processor is arranged to transform photo events tagged as 2-D target signal photo events into a four dimensional 4-D target tracking array including azimuth, azimuthal velocity, elevation, and elevation velocity parameters, discard photo events determined to be background photo events, and tag photo events determined to be 4-D target signal photo events, as a third step. The example laser detection and ranging system may include one or more of the following steps, either alone or in combination.

The processor may repeat the second and third steps for a plurality of iterations. After the first iteration, the photo events transformed in the second step are the tagged 4-D target signal photo events from the third step of the previous iteration. The parameters associated with each of the tagged 4-D target signal photo events may be stored in a memory. The parameters stored in a memory may represent a six dimensional (6D) array. The parameters may include range, range-rate, azimuth, azimuthal velocity, elevation, and elevation velocity.

The processor may determine that photo events with a signal strength lower than a detection threshold are the background photo events. The detection threshold may include a statistically significant photo event. The detection threshold applied in the second step may be different than the detection threshold applied in the third step.

The laser detection and ranging system may include a laser transmitter arranged to emit laser pulses toward a target. The photo events may include sparse video data.

An example method for laser detection and ranging includes receiving scattered laser pulses, as a first step. The method includes generating photo events based on the received scattered laser pulses, as a second step. The photo events include target signal photo events and background photo events. The method includes transforming the photo events into a two dimensional 2-D target tracking array including range and range-rate parameters, discarding photo events determined to be background photo events, and tagging photo events determined to be 2-D target signal photo events, as a third step. The method includes transforming photo events tagged as 2-D target signal photo events into a four dimensional (4-D) target tracking array including azimuth, azimuthal velocity, elevation, and elevation velocity parameters, discarding photo events determined to be background photo events, and tagging photo events determined to be 4-D target signal photo events, as a fourth step. The example method for laser detection and ranging may include one or more of the following steps, either alone or in combination.

The method may include repeating the third and fourth steps for a plurality of iterations. After the first iteration, the photo events transformed in the third step may be the tagged 4-D target signal photo events from the fourth step of the previous iteration.

The method may include storing the parameters associated with each of the tagged 4-D target signal photo events in a memory. The parameters may be stored in memory to represent a six dimensional (6D) array. The parameters may include range, range-rate, azimuth, azimuthal velocity, elevation, and elevation velocity.

Discarding photo events determined to be background photo events may include comparing the photo events signal strength, wherein photo events having a signal strength lower than a detection threshold are the background photo events. The detection threshold may include a statistically significant photo event. The detection threshold applied in the third step may be different than a detection threshold applied in the fourth step.

An example LADAR sparse state-space carving system includes a receiver. The receiver is arranged to receive scattered laser pulses and generate photo events based on the received scattered laser pulses. The photo events include target signal photo events and background photo events. The system includes a two dimensional 2-D target tracking detector arranged to transform the photo events into a 2-D target tracking array including range and range-rate parameters, discard photo events determined to be background photo events, and tag photo events determined to be 2-D target signal photo events. The system includes a four dimensional 4-D target tracking detector arranged to transform photo events tagged as 2-D target signal photo events into a 4-D target tracking array including azimuth, azimuthal velocity, elevation, and elevation velocity parameters, discard photo events determined to be background photo events, and tag photo events determined to be 4-D target signal photo events. The example LADAR sparse state-space carving system may include one or more of the following steps, either alone or in combination.

The 2-D target tracking detector and the 4-D target tracking detector may transform the photo events iteratively over a plurality of iterations. After the first iteration, the photo events input into and transformed by the 2-D target tracking detector may be the tagged 4-D target signal photo events from the 4-D target tracking detector during a previous iteration.

DETAILED DESCRIPTION

The subject technology addresses deficiencies associated with detection of dim signals in LADAR data. The application includes exemplary devices, systems, and methods for efficient processing of LADAR data including iterating back and forth between target detection in a two-dimensional array (range and range rate, herein referred to as R and $\dot{R}$ respectively) and a four-dimensional array (azimuth, azimuthal velocity, elevation, & elevation velocity, herein referred to as $\phi$, $\dot{\phi}$, $\theta$, and $\dot{\theta}$, respectively).

Figure 1:
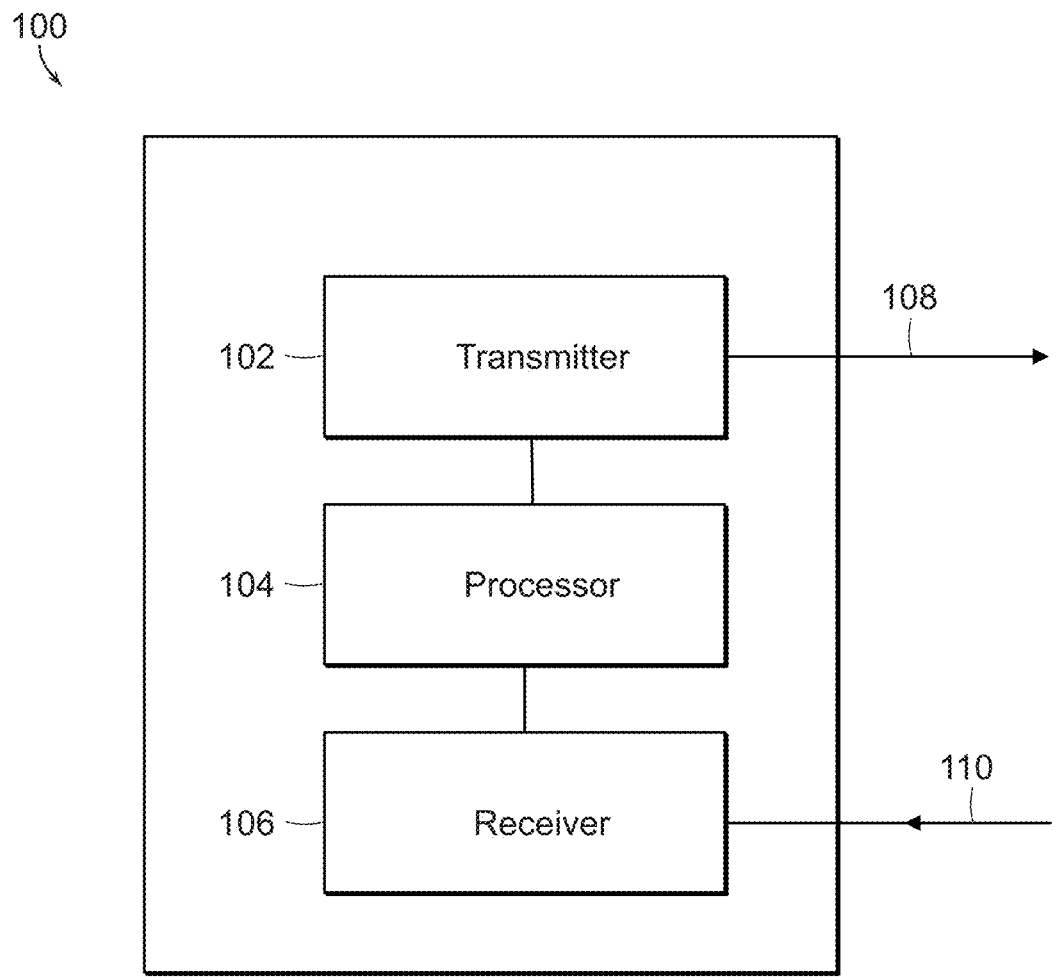
FIG. 1 is a block diagram of an exemplary laser detection and ranging (LADAR) system.

FIG. 1 is a block diagram of an exemplary LADAR system 100. System 100 includes a laser transmitter 102, a processor 104, and a receiver 106. Laser transmitter 102 is configured to emit laser pulses 108 while receiver 106 is configured to receive reflected and/or returned laser pulses 110 scattered from a target object and/or terrain. Processor 104 may perform functions such as, without limitation, streaming cross-correlations, artifact corrections, target acquisitions, and tracking and discrimination of targets. Processor 104 may generate image data and/or information for other systems such as an automatic target recognizer (ATR) system or a combat system/network such as AEGIS.

Figure 2:
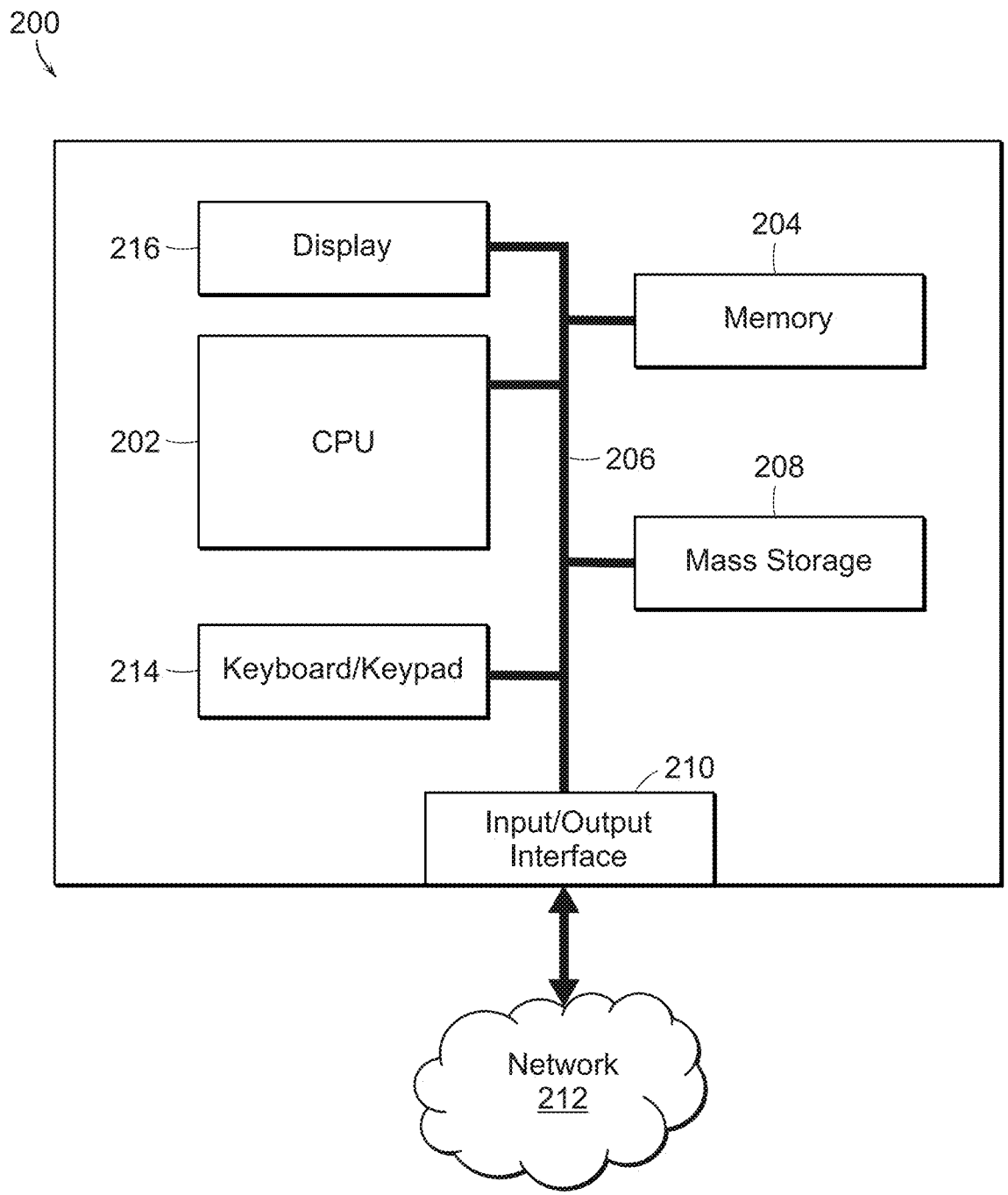
FIG. 2 is a block diagram of a computer system arranged to perform processing associated with a laser detection and ranging system.

FIG. 2 is block diagram of a computer system 200 arranged to perform processing associated with a LADAR system such as, for example, system 100, 300. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes the mass storage device 208 having, for example, various disk drives, tape drives, etc. The memory 204 also includes dynamic random access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202.

The mass storage 208 may include one or more magnetic disk, optical disk drives, and/or solid state memories, for storing data and instructions for use by the CPU 202. At least one component of the mass storage system 208, preferably in the form of a non-volatile disk drive, solid state, or tape drive, stores the database used for processing data and controlling functions of a LADAR system 100, 300. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card or any other suitable data communications device. To provide the functions of a processor according to FIG. 1, the data interface 210 may provide a relatively high-speed link to a network 212, such as an intranet, internet, Aegis network, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed multi-sensor processing related to, for example, a common operational picture (COP). Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212.

The computer system 200 may run a variety of application programs and store associated data in a database of mass storage system 208. One or more such applications may include a video filter array such as described with respect to FIGS. 4, 5, 6, 7 and 8.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as waveform control, streaming cross-correlations, artifact corrections, target acquisitions, and the tracking and discrimination of targets. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C #, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with system 100, 300, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the system 100 or 300 includes a networked-based, e.g., Internet-based, application that may be configured and run on the system 200 and/or any combination of the other components of the system 100 or 300. The computer system 200 may include a web server running a Web 2.0 application or the like. Web applications running on system 100 or 300 may use server-side dynamic content generation mechanisms such, without limitation, Java servlets, CGI, PHP, or ASP. In certain implementations, mashed content may be generated by a web browser running, for example, client-side scripting including, without limitation, JavaScript and/or applets on a wireless device.

In certain implementations, system 100, 200, and/or 300 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 100, 300, computer system 200, or another component of system 100 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

Figure 3:
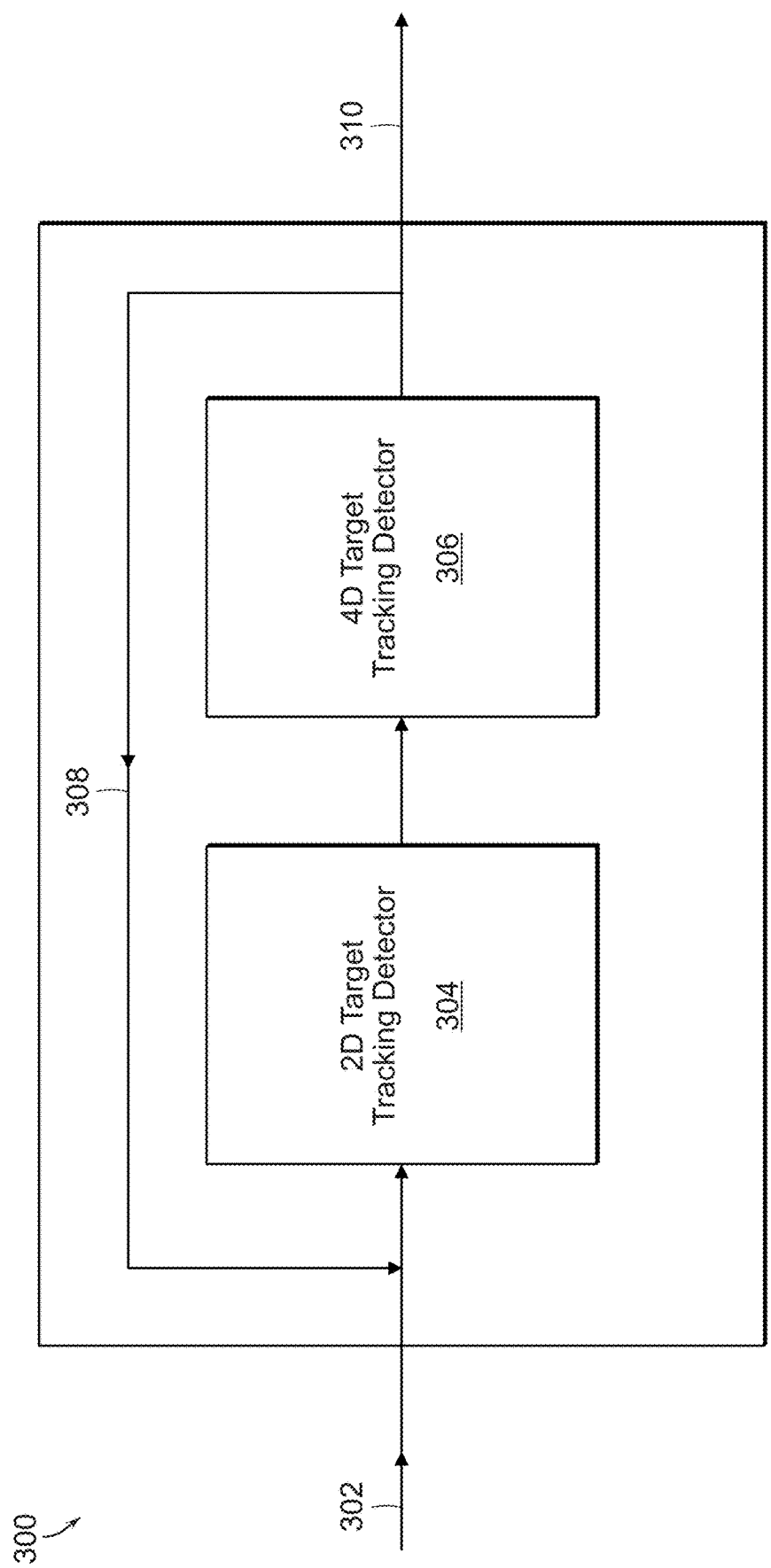
FIG. 3 is a block diagram of a six-dimensional tracking system arranged to perform processing associated with laser detection and ranging system data.

FIG. 3 is a block diagram of a six-dimensional tracking system 300 arranged to perform processing associated with laser detection and ranging system data. Video input data 302 may be transformed into the six-dimensional tracking system 300. The video input data 302 may include target photo events and background photo events, such that the video data 302 may be derived from a LADAR dwell of a target and the target surroundings. Video data 302 may be derived from received or scattered laser pulses, the laser pulses transmitted by a LADAR transmitter or the like. The video data 302 may include sparse and binary video data such as Geiger-Mode Avalanche Photodiode data (GMAPD).

In certain implementations, 2-D target tracking detector 304 may thereafter receive video data 302. 2-D target tracking detector 304 may be operated by use of processor 104 or exemplary computer system 200. The 2-D target tracking detector 304 may be configured to concurrently determine the range and the range-rate (i.e., velocity) of photo events within video data 302 based on transmissions of laser pulses, and received laser pulses such as return times of photons. Henceforth, the terms speed, velocity, and range-rate refer to the velocity of the target relative to the exemplary LADAR system 100 along the range axis (i.e., the line/direction connecting the exemplary LADAR system 100 and the target). The 2-D target tracking detector 304 may accurately determine these target characteristics despite complex scattering of the transmitted light, imperfect detection of the returns, unwanted detections due to ambient light and electrical noise, modulation of the return due to target motion, and/or other practical complications and limitations.

In some implementations, the 2-D target tracking detector 304 scales (e.g., stretches or compresses) the transmit times of emitted laser pulses according to a plurality of hypothesized and/or predicted velocities and, for each hypothesized velocity, computes a cross-correlation of the scaled transit times with the return times of detection events, and identifies the peak cross-correlation power value for the plurality of hypothesized/trial velocities. Determining the temporal scaling that yields the highest correlation peak value allows the 2-D target tracking detector 304 to concurrently (e.g., simultaneously) determine both the range and range-rate of photo events. An example 2-D target tracking detector that determines both the range and range-rate of photo events is described in U.S. patent application Ser. No. 16/863,064 (Greenberg & Marcus) entitled "SYSTEM AND METHOD FOR DETERMINING RANGE-RATE AND RANGE EXTENT OF A TARGET". The content of U.S. patent application Ser. No. 16/863,064, particularly the content related the process of target acquisition (e.g., FIG. 3 of U.S. patent application Ser. No. 16/863,064 and the accompanying description), is incorporated herein by reference.

In some implementations, the 2-D target tracking detector 304 may calculate the range and the range-rate of the target in video data 302 based on a plurality of cross-correlation power values, wherein the 2-D target tracking detector 304 identifies a peak cross-correlation power value (e.g., the highest cross-correlation value) from among the plurality of cross-correlation power values and determines the pair-wise difference value associated with the peak cross-correlation power value.

After determining the range and range-rate of the target within video data 302, or attempting to find at least one peak correlating to a statistically significant result within a two-dimensional array with range and range-rate dimensions, video data 302 may thereafter be transmitted to 4-D target tracking detector 306. Statistically significant results may reach a prescribed threshold of counts. Photo events associated with every range and range rate detection within video data 302 may be applied to the 4-D target tracking detector 306. 4-D target tracking detector 306 may cross-range filter the photo events, accounting for both focal plane position and focal plane motion over a LADAR dwell. Video data not associated with detections may be discarded or otherwise rejected before the video data is exported to 4-D target tracking detector 306.

In some implementations, 4-D target tracking detector 306 may be operated by use of processor 104 or exemplary computer system 200. The processor 104 or exemplary computer system 200 may be arranged to generate a video filter array, the video filter array (VFA) including a set of estimated velocity pixel coordinate components arranged in a linear data set while representing a plurality of two-dimensional arrays associated with a plurality of frames. The VFA may be stored in memory 204 and/or mass storage 208. Each of the plurality of two-dimensional arrays may have dimensions equal to dimensions of the focal plane array of the receiver 106, and generate a plurality of detected photo events based on received scattered laser pulses or video data. The 4-D target tracking detector 306 may also filter the plurality of photo events transmitted to it by linearly indexing each of the plurality of detected photo events based on, for each detected photo event, a vertical position in the focal plane array, a horizontal position in the focal plane array, a frame number, and the dimensions of the focal-plane array. The 4-D target tracking detector 306 may map each detected photo event to a set of estimated velocity pixel coordinate components based on a time between receiving the scattered laser pulses and the focal-plane array vertical and horizontal positions of each of the detected photo events. In return, the 4-D target tracking detector 306 may generate a motion-compensated image associated with the mapped plurality of detected photo events in a filtered two-dimensional array having dimensions equal to the dimensions of the focal plane array. Further details regarding an implementation of a 4D tracker are described in co-pending U.S. patent application Ser. No. 17/138,365, entitled "VIDEO-TRACKING OF SPARSE GEIGER-MODE DATA", filed on Dec. 30, 2020, particularly the content related to generating a video filter array and using a video filter array with Geiger-mode video data (e.g., FIGS. 5-8 and the accompanying description) are incorporated herein by reference.

As a result, four-dimensional filtered and motion compensated focal plane array images may be generated. Six dimensional tracking system 300 may thereafter associate each four dimensional detection with the video data that comprises it, and all other video data may be disposed of or otherwise rejected. With the four dimensional detection video data, six-dimensional tracking system 300 may iterate 308, wherein the four dimensional detection video data is applied to 2-D target tracking detector 304, and subsequently 4-D target tracking detector 306. Six dimensional tracking system 300 may iterate 308 multiple times. Six dimensional tracking system 300 may, in some implementations, refrain from iterating 308 entirely. The resulting video data 310 may thereafter be transmitted, exported, or the like to another system for further processing.

Figure 4:
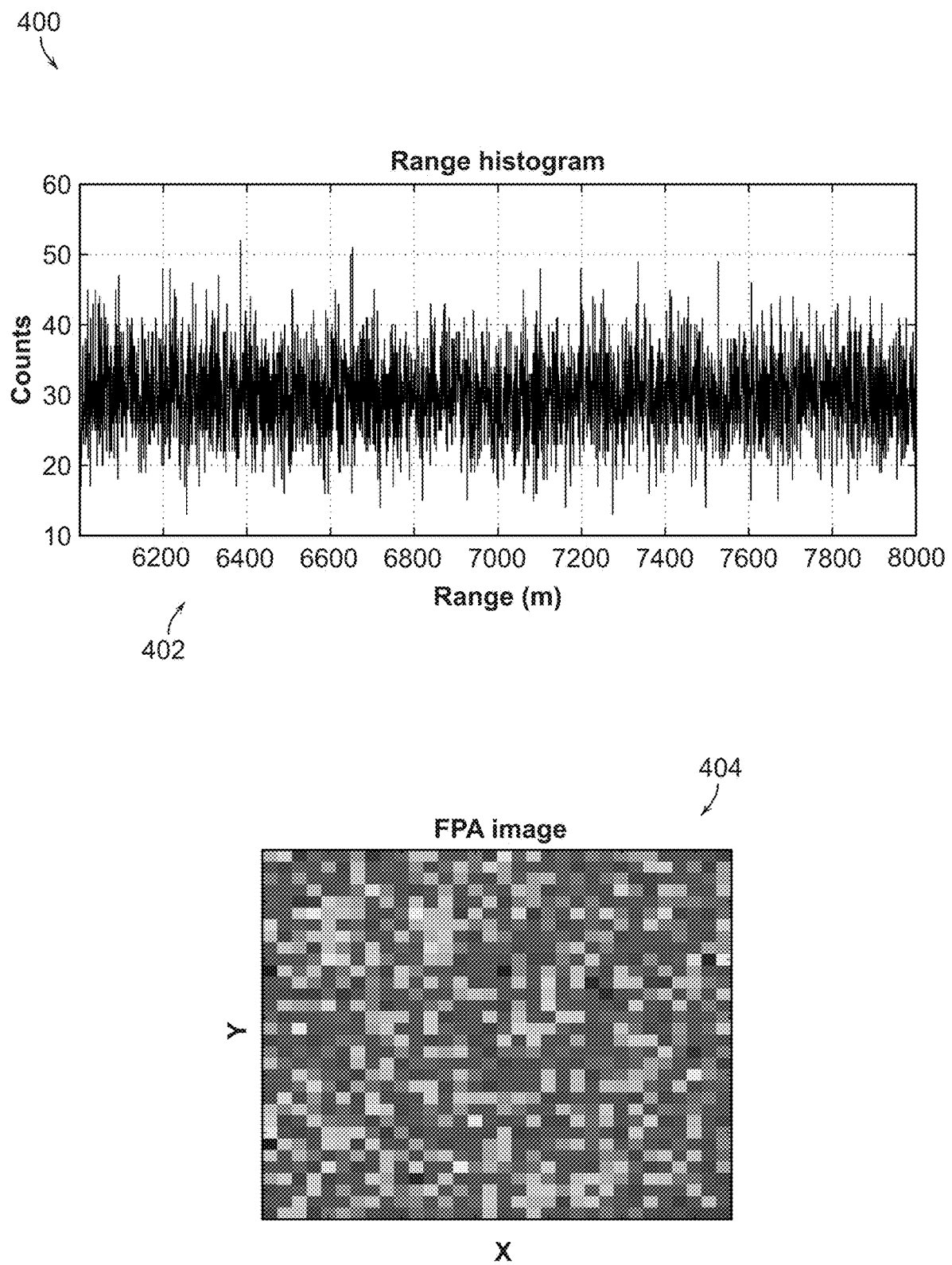
FIG. 4 is an example set of simulated video data including background photo-events and signal photo events.

FIG. 4 is an example set of simulated video data 302, 400 including background photo-events and signal photo events. The example set of simulated video data 400 includes video data of a low-signal target moving in range and cross-range, for which the range-location was known a priori to lie between 6 kilometers and 8 kilometers from LADAR system 100, as illustrated in range histogram 402. The example set of simulated video data 400 includes roughly 740,000 background photo events and roughly 35-50 signal photo events. The signal photo events are not detectable to a statistically significant degree in a focal plane array image 404 with x and y orthogonal dimensions. Neither are signal photo events detectable to a statistically significant degree when all video data is projected onto range histogram 402 with range and count dimensions. This may be the result of the target having a velocity in a given direction, such that the sparse number of signal photo events are spread out in space and would not yield a statistically significant peak in projected video data. Statistically significant results may reach a prescribed threshold of counts.

Figure 5:
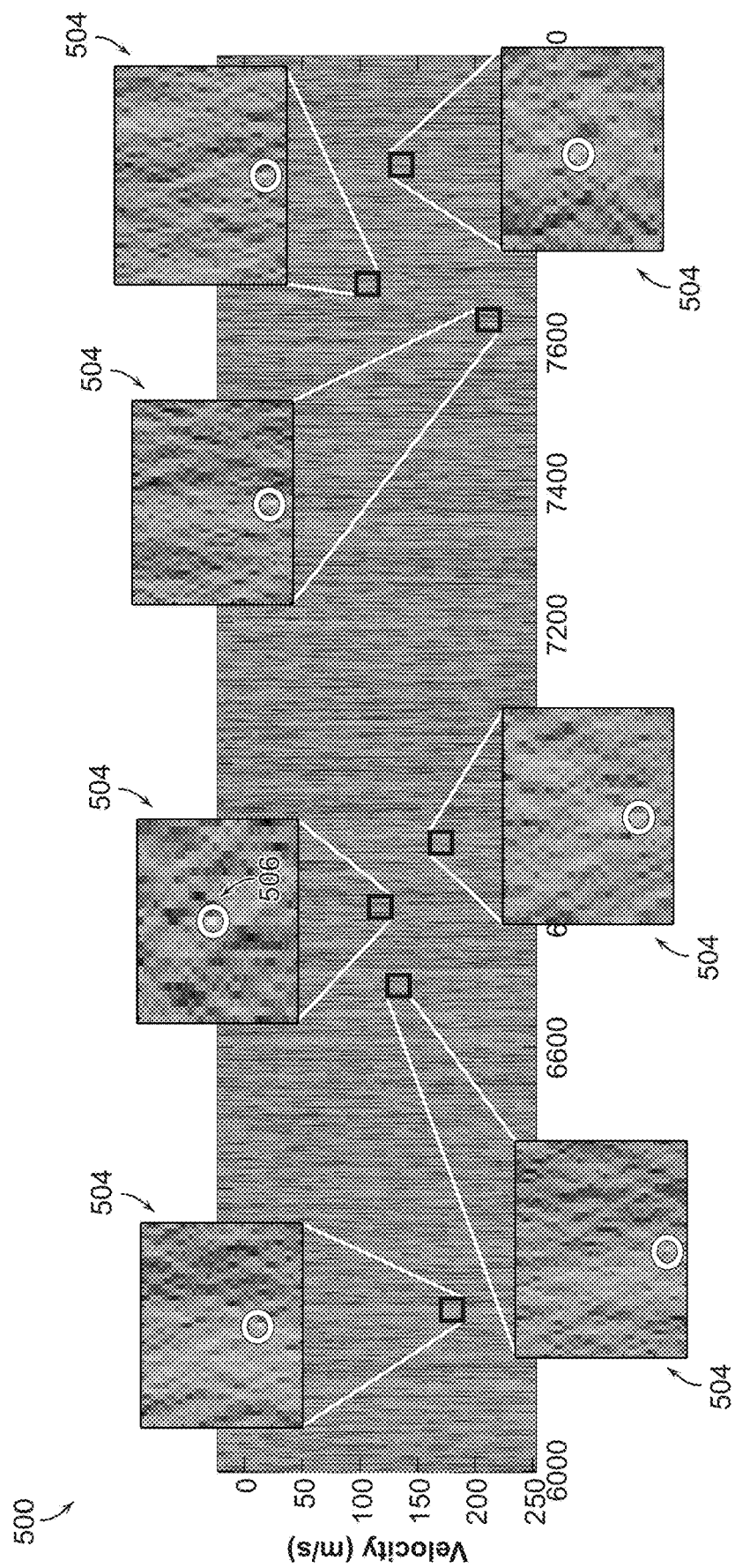
FIG. 5 is the example set of simulated video data projected into a heat map illustrating cross-correlation values as a function of velocity and range of a simulated target.

FIG. 5 is the example set of simulated video data of FIG. 4 projected into a heat map 500 illustrating cross-correlation values as a function of velocity and range of a simulated target. The heat map 500 illustrates minor peaks and troughs, which may be due to background noise and other undesirable effects, and a series of major peaks 504, which representing statistically significant photo events, some potentially of an intended target. The many peaks and troughs may result from stochastic noise, whereby it is possible to receive a sequence of background photons/events that happen to line up with some of the transmit times, and thus generate local peaks in the cross-correlation power values. As the target's velocity changes, the location of the peaks in the heat map 500 may move up or down (to reflect a higher or lower velocity), however, the magnitude of the peak will not change.

In light of the example set of simulated video data in FIG. 5, in some implementations, the LADAR system 100 is capable of transforming raw sensor or video data (e.g., photon detection events), into a space or array where targets manifest as peaks in a signal such as heat map 500. This transformation may be performed in a streaming manner, which allows for up-to-date real-time knowledge of a target's dynamical state, with a constant latency. Despite the fact that a target's range-rate is not known in advance in application of the subject technology, the LADAR system 100 may utilize the fact that the target range-rate has a predictable effect on return timing to estimate the range-rate via hypothesis and test. That is, the LADAR system 100, particularly 2-D target tracking detector 304, applies a series of cross-correlations to the return data, each against the transmit waveform scaled per a different hypothesized range-rate. The LADAR system 100 may also leverage a baseline sparse cross-correlation algorithm to rapidly calculate each row of a two dimensional array parametrized by range and range-rate. In this transformed space, a moving target presents as a single peak, for which the range and range-rate can be extracted. This target acquisition process according to some embodiments can work with any transmit waveform, and can therefore be combined with optimal pulse position modulation waveforms in range-ambiguous scenarios. Furthermore, because the LADAR system 100 can estimate both state variables simultaneously, it can detect high-speed, low-SNR targets that would be undetectable with any two-step method.

Projecting video data, in the implementation described above, into a range and range rate two-dimensional array may return several statistically significant photo events 504. The statistically significant photo events 504 may be statistically significant because a number of photo events were detected at the respective range and range-rate such that a target may exist therein. Statistically significant results may reach a prescribed threshold of counts. For example, within the example video data, peak 506 was determined to be most statistically significant, projected into a two-dimensional array. A 2-D target tracking detector 304 would, in return, determine peak 506 to include target photo events. Although, because of the nature of the example data such that it comprises roughly 740,000 background photo events and roughly 35-50 signal photo events, projecting the video data into a two-dimensional array having range and range rate dimensions yielded several statistically significant photo events 504, and as such peak 506 may not actually consist of target photo events.

As a result, in some implementations of the subject technology, photo events of video data 302 that caused peaks 504 may be retrieved from the raw video data and passed from the 2-D target tracking detector 304 to the 4-D target tracking detector 306. A portion of photo events of video data 302, not corresponding to peaks 504 may be discarded or otherwise rejected.

Figure 6:
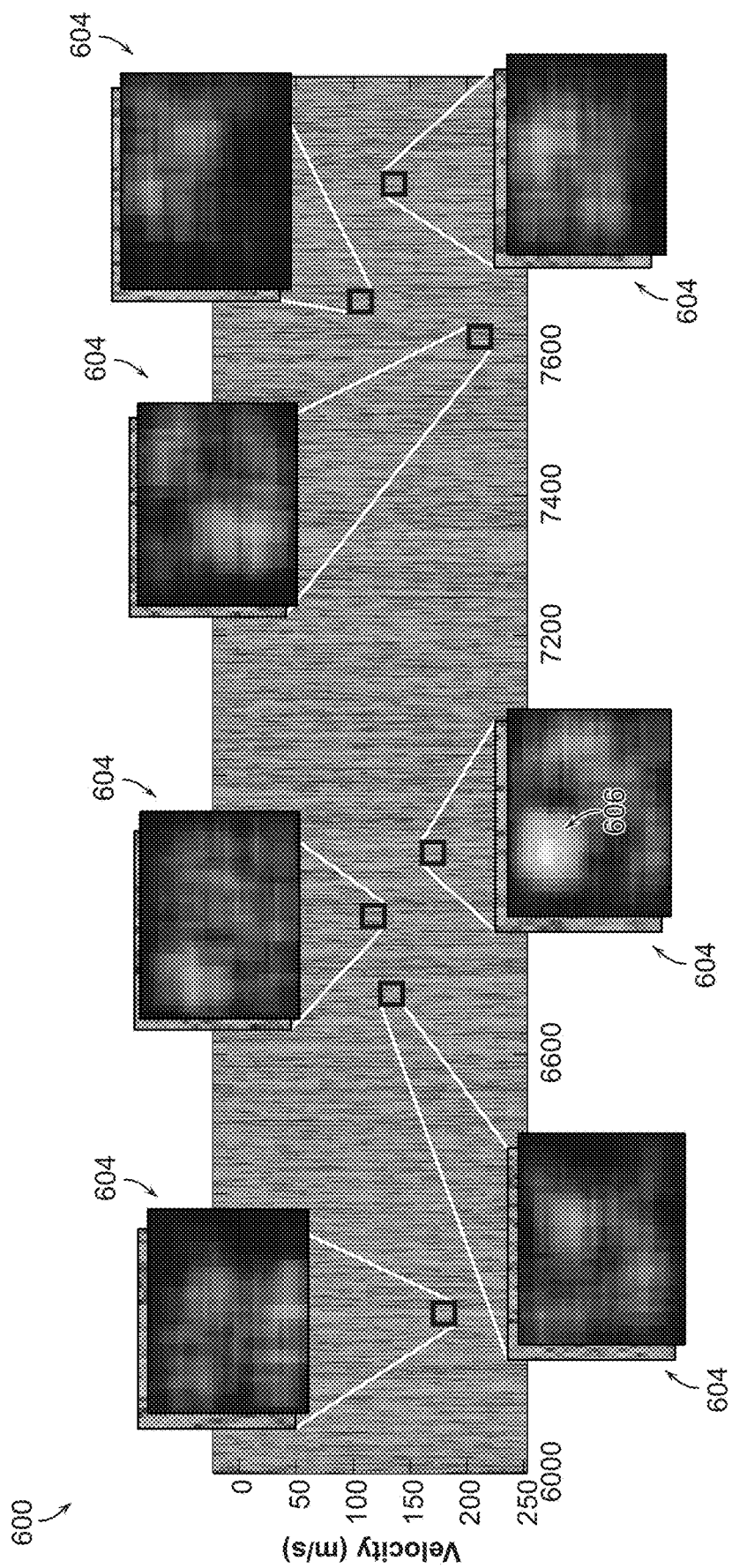
FIG. 6 is the example set of simulated video data projected into a four-dimensional array, illustrated as a slice through two of the dimensions containing a peak.

FIG. 6 is the example set of simulated video data after projection into 4-D target tracking detector 306. The figure shows two-dimensional slices through the 4-D space, referred to herein as motion compensated images 604, correlated to peaks 504 after projection into 2-D target tracking detector 304.

The 4-D target tracking detector 306 illustrates cross-correlation values as a function of azimuth, azimuth rate, elevation, and elevation rate on a two-dimensional heat map. As such, the 4-D target tracking detector 306 may implement Sparse Video Tracking, explained in further detail above. When photo events associated with every range and range-rate detection are passed from the 2-D target tracking detector 304 to the 4-D target tracking detector 306, the photo events are projected into a four-dimensional space and/or array having azimuth, azimuth rate, elevation, and elevation rate orthogonal dimensions.

It is noteworthy that peak 606 of azimuth, azimuth rate, elevation, and elevation rate space does not correlate to the most statistically significant peak 506 in range and range-rate space. Peak 506, having a statistically significant culmination of photo events in range and range-rate space, became diffuse in azimuth, azimuth rate, elevation, and elevation rate space. As such, peak 506 may not represent a target. A target should portray a statistically significant culmination of photo events in azimuth, azimuth rate, elevation, and elevation rate space along with range and range-rate space. Statistically significant results may reach a prescribed threshold of counts.

After 4-D target tracking detector 306 projects and extracts statistically significant photo events 606 correlating to proposed target photo events in four dimensions, an output 310 may be generated, the output including the significant photo events 606 such that the significant photo events 606 are a hypothesis and/or prediction of target signal photons or video data containing hypothesized and/or predicted target photo events. Alternatively, 4-D target tracking detector may iterate 308 photo events corresponding to peak 606. A portion of photo events 302, not corresponding to peak 606 may be discarded or otherwise rejected.

Figure 7:
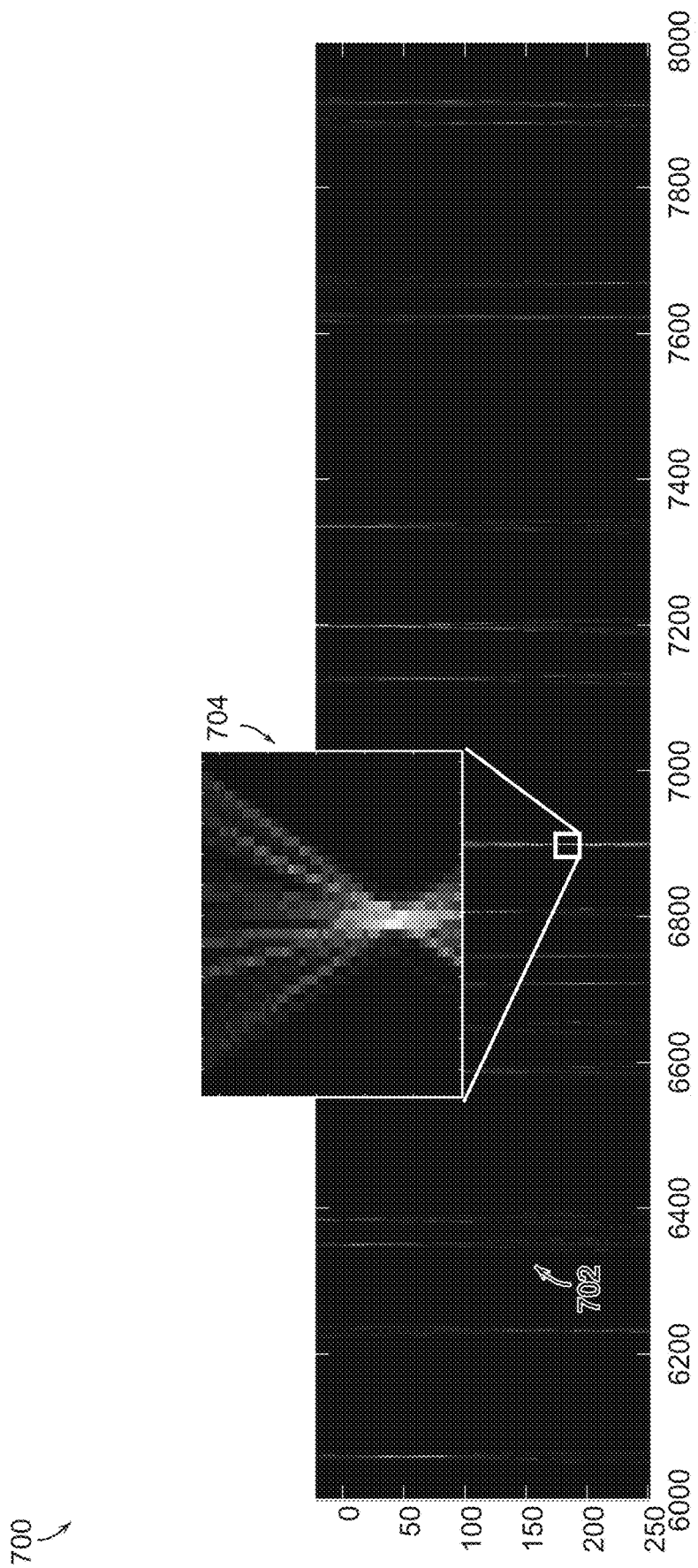
FIG. 7 is the example set of simulated video data showing background and a correctly localized target after one iteration of the subject technology.

FIG. 7 is a heat map 700 of the example set of simulated video data showing a correctly localized target 704 after an iteration 308 of two-dimensional and four-dimensional target tracking. Background events 702 were retained as a side effect of range ambiguity. Background events 702 may be discarded upon another iteration 308 of two-dimensional and four-dimensional target tracking.

Figure 8:
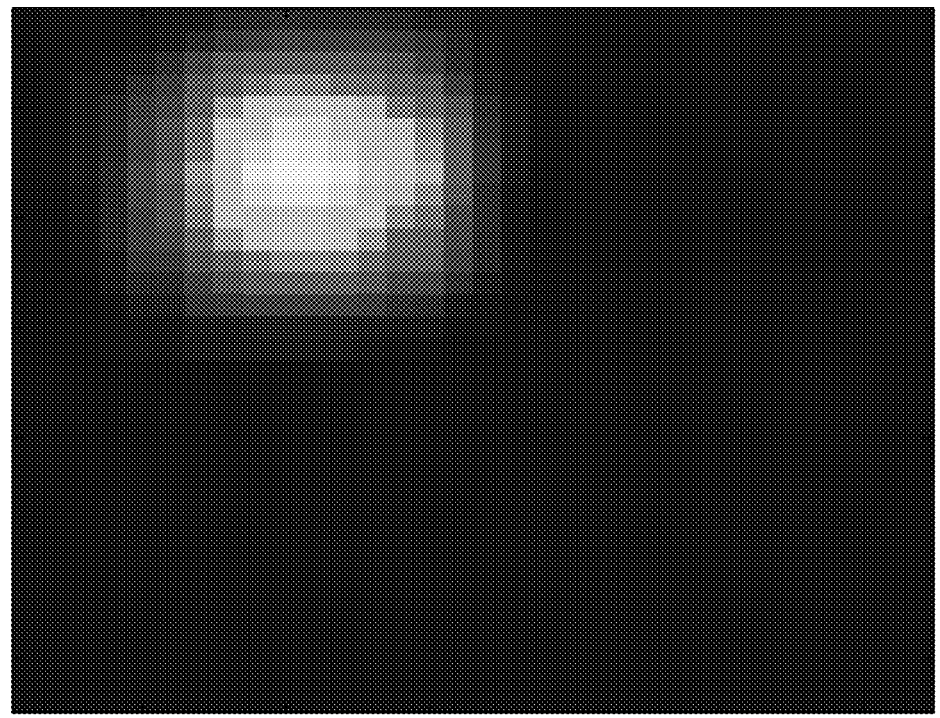
FIG. 8 is a motion compensated focal plane array image of the example set of simulated video data after two iterations of the subject technology.

FIG. 8 is a motion compensated focal plane array image 802 having an x-axis 804 and y-axis 806 illustrating 48 photo events which may be target photo events after the six dimensional target tracking detection of the subject technology. As a result 99.994% of video data 302 was discarded or otherwise rejected as background photo events.

It will be apparent to those of ordinary skill in the art that certain aspects involved in the operation of the system 100, 300, or other devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. A laser detection and ranging system comprising:
   a receiver arranged to receive scattered laser pulses; and
   a processor arranged to:
   A. generate photo events based on the received scattered laser pulses, the photo events including target signal photo events and background photo events,
   B. transform the photo events into a two dimensional 2-D target tracking array including range and range-rate parameters resulting in 2-D photo events, discard photo events determined to be a subset of the background photo events based on corresponding 2-D photo events of the 2-D photo events, and tag photo events determined to be 2-D target signal photo events, and C. transform photo events tagged as 2-D target signal photo events into a four dimensional 4-D target tracking array including azimuth, azimuthal rate, elevation, and elevation rate parameters resulting in 4-D photo events, discard photo events determined to be a further subset of the background photo events based on corresponding 4-D photo events of the 4-D photo events, and tag photo events determined to be 4-D target signal photo events.

2. The laser detection and ranging system of claim 1, wherein the processor repeats steps B and C for a plurality of iterations, and wherein, after a first iteration of the plurality of iterations, the photo events transformed in step B are the tagged 4-D target signal photo events from step C of an immediately previous iteration of the plurality of iterations.

3. The laser detection and ranging system of claim 1, comprising storing the parameters associated with each of the tagged 4-D target signal photo events in a memory.

4. The laser detection and ranging system of claim 3, wherein the parameters are stored in memory to represent a six dimensional (6D) array.

5. The laser detection and ranging system of claim 4, wherein the parameters include range, range-rate, azimuth, azimuthal rate, elevation, and elevation rate.

6. The laser detection and ranging system of claim 1, wherein the processor determines that photo events with a signal strength lower than a detection threshold are the background photo events.

7. The laser detection and ranging system of claim 6, wherein the detection threshold includes a statistically significant photo event.

8. The laser detection and ranging system of claim 6, wherein the detection threshold applied in step B is different than a detection threshold applied in step C.

9. The laser detection and ranging system of claim 1 further comprising a laser transmitter arranged to emit laser pulses toward a target.

10. The laser detection and ranging system of claim 1, wherein the photo events include sparse video data.

11. A method for laser detection and ranging comprising:
A. receiving scattered laser pulses
B. generating photo events based on the received scattered laser pulses, the photo events including target signal photo events and background photo events,
C. transforming the photo events into a two dimensional 2-D target tracking array including range and range-rate parameters resulting in 2-D photo events, discarding photo events determined to be a subset of the background photo events based on corresponding 2-D photo events of the 2-D photo events, and tagging photo events determined to be 2-D target signal photo events, and
D. transforming photo events tagged as 2-D target signal photo events into a four dimensional (4-D) target tracking array including azimuth, azimuthal rate, elevation, and elevation rate parameters resulting in 4-D photo events, discarding photo events determined to be a further subset of the background photo events based on corresponding 4-D photo events of the 4-D photo events, and tagging photo events determined to be 4-D target signal photo events.

12. The method of claim 11, comprising repeating steps C and D for a plurality of iterations, and wherein, after a first iteration of the plurality of iterations, the photo events transformed in step C are the tagged 4-D target signal photo events from step D of an immediately previous iteration of the plurality of iterations.

13. The method of claim 11, comprising storing the parameters associated with each of the tagged 4-D target signal photo events in a memory.

14. The method of claim 13, wherein the parameters are stored in memory to represent a six dimensional (6D) array.

15. The method of claim 14, wherein the parameters include range, range-rate, azimuth, azimuthal rate, elevation, and elevation rate.

16. The method of claim 11, discarding photo events determined to be background photo events includes comparing a signal strength of the photo events to a detection threshold and discarding photo events having a signal strength lower than the detection threshold as the background photo events.

17. The method of claim 16, wherein the detection threshold includes a statistically significant photo event.

18. The method of claim 16, wherein the detection threshold applied in step C is different than a detection threshold applied in step D.

19. A LADAR sparse state-space carving system comprising:
a receiver arranged to receive scattered laser pulses and generate photo events based on the received scattered laser pulses, the photo events including target signal photo events and background photo events,
a two dimensional 2-D target tracking detector arranged to transform the photo events into a 2-D target tracking array including range and range-rate parameters resulting in 2-D photo events, discard photo events determined to be a subset of the background photo events, and tag photo events determined to be 2-D target signal photo events based on corresponding 2-D photo events of the 2-D photo events, and
a four dimensional 4-D target tracking detector arranged to transform photo events tagged as 2-D target signal photo events into a 4-D target tracking array including azimuth, azimuthal rate, elevation, and elevation rate parameters resulting in 4-D photo events, discard photo events determined to be a further subset of the background photo events based on corresponding 4-D photo events of the 4-D photo events, and tag photo events determined to be 4-D target signal photo events.

20. The system of claim 19, wherein the 2-D target tracking detector and the 4-D target tracking detector transform the photo events iteratively over a plurality of iterations, and wherein, after a first iteration of the plurality of iterations, the photo events input into and transformed by the 2-D target tracking detector are the tagged 4-D target signal photo events from the 4-D target tracking detector during an immediately previous iteration of the plurality of iterations.

* * * * *